United States Patent Office 3,733,332
Patented May 15, 1973

3,733,332
HALOGENATED CYANOACETIC ACID PIPERIDIDE
Werner Toepfl, Basel, and Hans-Rudolf Hitz, Muttenz, Switzerland, assignors to Ciba-Geigy AG
No Drawing. Original application July 30, 1965, Ser. No. 476,192, now Patent No. 3,557,184. Divided and this application Sept. 8, 1970, Ser. No. 70,139
Int. Cl. C07d 29/32
U.S. Cl. 260—293.86                     2 Claims

ABSTRACT OF THE DISCLOSURE

New pesticidal preparations are provided which contain as the active component a compound represented by the formula:

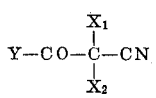

wherein $X_1$ and $X_2$ represent hydrogen or halogen, and Y represents the radical —OR where R stands for an alkyl or chloralkyl radical containing up to 18 carbon atoms or the radical.

in which $R_1$ and $R_2$ are identical or different and each represents hydrogen or alkyl, alkoxyalkyl, dialkylaminoalkyl, cyclohexyl, or for a phenyl radical or for the radical of the formula

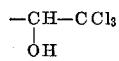

or, together with the nitrogen atom, form a morpholine, piperidine or piperazine ring which latter is substituted by the radical —CO—CCl$_2$—CN together with a suitable carrier. The preparation may contain one or several of the following additives: solvents, diluents, dispersants, wetting agents, adhesives and other pesticides.

CROSS REFERENCE TO RELATED APPLICATION

This application is a division of application Ser. No. 476,192, filed July 30, 1965, now U.S. Pat. No. 3,557,184.

The present invention provides a pesticidal preparation, which comprises an active ingredient a compound of the general formula

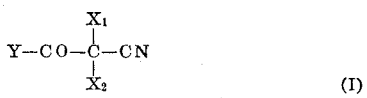

wherein $X_1$ represents a hydrogen or halogen atom, preferably a chlorine or bromine atom, $X_2$ represents a halogen atom, preferably a chlorine or bromine atom, and Y represents the radical —OR where R stands for an alkyl or chloralkyl radical containing up to 18, preferably up to 4, carbon atoms or for the radical

(in which $R_1$ and $R_2$ are identical or different and each represents a hydrogen atom or an alkyl, alkoxyalkyl, dialkylaminoalkyl, cyclohexyl radical containing up to 18, preferably up to 4, carbon atoms), or for a phenyl radical or for the radical of the formula

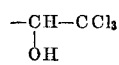

or, together with the nitrogen atom, form a morpholine, piperidine or piperazine ring which latter is substituted by the radical —CO—CCl$_2$—CN together with a suitable carrier. The preparation may contain one or several of the following additives: solvents, diluents, dispersants, wetting agents, adhesives and other pesticides.

According to a special variant, the present invention provides pesticides of the kind defined above which contain as active ingredient a compound of the general Formula I in which $X_1$ represents a hydrogen or a halogen atom, preferably a chlorine or bromine atom; $X_2$ represents a halogen atom, preferably chlorine or bromine and Y represents the radical

where $R_1$ and $R_2$ are identical or different and each represents a radical containing up to 12, preferably up to 4, carbon atoms. Among these pesticides, those are particularly valuable which contain as active ingredient a compound of the general formula

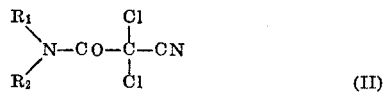

where $R_1$ represents a hydrogen atom and $R_2$ a lower alkyl radical.

The new compounds are manufactured in known manner by reacting the unhalogenated starting material with free halogen or with a halogenating agent, for example sulfuryl-chloride, in the presence or absence of a catalyst. The N-substituted amides of cyanoacetic acid used as starting material are readily accessible from the lower alkyl esters of cyanoacetic acid, preferably the methyl ester, and the corresponding amine, for example thus

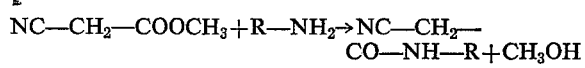

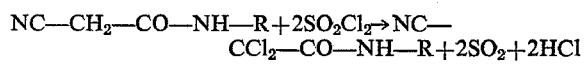

The new compounds of the general Formula I, especially the compound of the formula

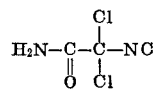

have above all a good action against harmful fungi, fungus spores and bacteria. They are suitable for use in general pest control, in plant protection and in hygiene. In this sphere, it is especially advantageous that the compounds, for example when used in plant protection, display no toxic side effects towards the host organism when used in a concentration necessary for parasite control. The new compounds may also be used for combating harmful organisms in timber protection, for preserving a wide variety of technical products, for protecting fibrous materials from injurious micro-organisms, for preserving agricultural produce, as disinfectants, in veterinary medicine and human body hygiene.

In this connection it is especially important that the compounds of this invention do not lose their bactericidal and fungicidal activity even in the presence of proteinic substances and soaps.

As examples of the use of the new compounds in plant protection, there may be mentioned the treatment of plant seeds and of wholly or only partially developed plants, as well as of the soil in which the plants grow, as a protection against harmful organisms, especially harmful fungi, fungus spores and bacteria.

As examples of technical products that can be preserved or disinfected with the aid of the new active compounds there may be mentioned: Textile assistants and improving agents, glues, binders, paints, thickeners, color and printing pastes and similar preparations incorporating organic or inorganic dyestuffs or pigments, including those containing casein or other organic compounds. Walls and ceilings painted, for example, with paints containing an albuminous paint binder can be protected from infestation by pests, by addition of the new compounds.

Furthermore, the new compounds are suitable for treating fibrous and textile materials to protect them against the action of harmful organisms, for example fungi and bacteria. The new compounds may be added for this purpose before, simultaneously with or after treating the textile materials with other substances, for example with dyestuff or printing pastes, dressing agents, or the like.

Textile materials treated in this manner are also protected from the appearance of perspiration odor such as is caused by microorganisms.

The new compounds may also be used in the cellulose and paper industries as preserving agents, inter alia for preventing the dressing agents used in the manufacture of paper from the known slime formation due to microorganisms in the paper making machines.

As further pesticides that may be used in combination with the active ingredients of the general Formula I there may be mentioned: Further fungicides, bactericides, as well as acaricides, insecticides and fertilizers.

Depending on the type of additives with which the new active substances are combined in the preparations of this invention, there are obtained products that are particularly suitable for disinfection or for body hygiene.

Thus, for example, by combining the compounds of this invention with wash-active or surface-active substances there are obtained washing or cleaning agents having an excellent antibacterial or antimycotic effect respectively. The compounds of the general Formula I may be, for example, incorporated in soaps or combined with soaps or combined with soap-free wash-active or surface-active substances, or they may be combined with mixtures of soap-free wash-active substances.

As examples of soap-free wash-active compounds that can be used in admixture with the new substances there may be mentioned, for example, alkylarylsulfonates, fatty alcohol sulfates, condensation products from fatty acids and methyl-taurine, condensation products from fatty acids and hydroxy-ethanesulfonates, fatty acid+albumen condensation products, alkylsulfonates, nonionic products for example, condensation products from alkylphenols with ethylene oxides, as well as cationic compounds. The new compounds may also be used in industrial detergents, for example in conjunction with a condensed phosphate, for example, 20 to 50% of alkali metal tripolyphosphate, or in the presence of an organic lyophilic polymer capable of increasing the dirt carrying capacity of the washing liquor, for example, an alkali metal salt of carboxymethylcellulose (cellulose glycollic acid).

The addition of a cleaning agent, for example an anionic, cationic or non-ionic product, to the new compounds not only does not impair their antibacterial or antimycotic action but, in fact, in many cases such a combination produces a surprising synergism of their action.

The cleaning agents of the invention, which contain compounds of the general Formula I, may be used as industrial or domestic cleaning agents, as well as in the food and beverages industries, for example, in dairies, breweries and abattoirs.

The new compounds may also be used as ingredients of preparations used for cleaning and disinfecting in hospitals and in medicinal practice, for example for cleaning patients' underwear, wards and apparatus, for which purpose the new compounds may, if desired, be combined with other disinfectants and antiseptically active products so that the degree of cleaning or disinfection required in individual cases can be achieved. The fact that the new compounds do not lose their efficacy towards microorganisms even in the presence of blood or serum is of special importance in this connection.

The new compounds may also be incorporated in preparations used for skin cleaning, for example cleaning the hands, so as to achieve an antibacterial or antimycotic effect, either by themselves or in conjunction or admixture with other antibacterial or fungicidal substances, skin protectives or the like. Furthermore, they prevent the appearance of unpleasant body odor such as is produced by microorganisms. In this connection it is an advantage that the new compounds do not cause skin irritation on healthy skin.

As additives having a microbicidal action, which may be contained in the preparations of this invention together with compounds of the general Formula I, there may be mentioned, for example, 3,4-dichlorobenzyl alcohol, ammonium compounds, for example diisobutyl phenoxyethoxyethyl dimethylbenzyl ammonium chloride, cetyl pyridinium chloride, cetyl trimethyl ammonium bromide, halogenated dihydroxydiphenyl-methanes, tetramethyl thiuram disulfide, 2,2' - thio - bis - (4,6 - dichlorophenol); furthermore organic compounds containing the thiotrichloromethyl group, which have been disclosed in U.S. specification Nos. 2,553,772; 2,553,770; 2,553,775; 2,553,-773; 2,553,774; 2,553,777 and 2,553,778, 2-nitro-2-furfuryliodide (cf. Austrian specification No. 210,411), salicyl anilides, dichlorosalicyl anilides, dibromosalicyl anilides, tribromosalicyl anilides, dichlorocyanuric acid, tetrachlorosalicyl anilides, aliphatic thiuram sulfide, hexachlorophen (2,2' - dihydroxy - 3,5,6-3',5',6'-hexachlorodiphenylmethane).

To suit the many ways in which the preparations of this invention containing compounds of the general Formula I can be used, they may be in a wide variety of forms, for example tableted, semi-solid or liquid soaps, pastes, powders, emulsions, suspensions, solutions in organic solvents, sprays, granulates, tablets, pencils, in capsules from gelatin or other materials.

The effect of the preparations of this invention against pests especially harmful microorganisms, may also be imparted to mouldings from plastics. When a plasticizer is to be used, it is advantageous to add the biocidal ingredient to the plastic material in the form of a solution or dispersion in the plasticizer. Advantageously, it should be distributed as evenly as possible in the plastic material, Plastic materials having antiseptic properties may be used for making a wide variety of utilitarian articles which are described to be resistant to a wide variety of germs, for example putrefactive germs or skin fungi, for example in doormats, handles, door fittings, public seats, treads in swimming pools, wall coverings or the like. When they are incorporated with suitable floor waxes or floor products, there are obtained products for treating floors and furniture having a disinfectant effect.

In addition, by virtue of their broad activity spectrum the compounds of the general Formula I are effective against insects, for example flies and midges, acarides, for example mites, molluses for example snails, and nematodes, as well as undesired plant growth; furthermore, they may be used as cotton defoliants.

The present invention further includes the new compounds of the general Formula I, where $X_1$ is a hydrogen atom or a halogen atom, preferably a chlorine or bromine atom; $X_2$ represents a halogen atom, preferably a chlorine or bromine atom and Y stands for the radical

in which $R_1$ and $R_2$ are identical or different and each represents a radical containing up to 12, preferably up to 4, carbon atoms.

The following examples illustrate the invention. Percentages and parts are by weight.

EXAMPLE 1

(1) N-(n-butyl)-2,2-dichloro-cyanoacetamide 99 parts of cyanoacetic acid methyl ester were mixed with 73 parts of n-butylamine, while maintaining the temperature between 25 and 30° C., by cooling with ice. The mixture was left for 12 hours at room temperature, and the methanol formed was then distilled off under vacuum. The residue crystallized on cooling and could be used without requiring purification. 350 parts of sulfurylchloride were then dropped in at room temperature, whereupon the mixture turned liquid and a rapid evolution of the gas set in. When the evolution of gas had slowed down, the reaction was finalized by heating the batch for 2 hours at 110° C., and the excess sulfurylchloride was then removed under vacuum. The radical was distilled under vacuum; it boiled at 104 to 106° C. under 0.07 mm. Hg pressure.

$C_7H_{10}ON_2Cl_2$. Calcd. (percent): N, 13.4; Cl, 33.9. Found (percent): N, 13.2; Cl, 34.3.

The following compounds were prepared in an analogous manner:

(2) 2,2-dichloro-cyanoacetamide, M.P. 89–91° C. (benzene)

(3) N-methyl-2,2-dichlorocyanoacetamide, M.P. 77–79° C.; B.P. 102° C. under 0.5 mm. Hg (4) N-ethyl-2,2-dichloro-cyanoacetamide, M.P. 56–59° C.; B.P. 102° C. under 0.8 mm. Hg (5) N-(n-propyl)-2,2-dichloro-cyanoacetamide, M.P. 33–35° C.; B.P. 98–99° C. under 0.25 mm. Hg (6) N - (isopropyl) - 2,2-dichloro-cyanoacetamide, M.P. 72–75° C.; B.P. 100° C. under 0.5 mm. Hg (7) N-(isobutyl)-2,2-dichloro-cyanoacetamide, M.P. 32–35° C.; B.P. 99–100° C. under 0.5 mm. Hg (8) N-(secondary butyl)-2,2 - dichloro-cyanoacetamide, M.P. 31–33° C.; B.P. 99–100° C. under 0.3 mm. Hg (9) N - (n - dodecyl)-2,2-dichloro-cyanoacetamide, M.P. 30° C.

(10) N - (3 - methoxypropyl) - 2,2-dichloro-cyanoacetamide; B.P. 123° C. under 0.8 mm. Hg

(11) N-(cyclohexyl)-2,2-dichloro-cyanoacetamide; M.P. 79–81° C. (hexane)

(12) 2,2-dichloro-cyanoacetic acid morpholide; M.P. 60–63° C., B.P. 123–124° C. under 0.4 mm. Hg

(13) 2,2-dichloro-cyanoacetic acid piperidide, M.P. 51–53° C., B.P. 109–110° C. under 0.07 mm. Hg

(14) 2-chloro-cyanoacetic acid anilide, M.P. 200–204° C.

(15) N,N - (diethyl)-2,2-dichloro-cyanoacetamide, B.P. 90° C. under 0.25 mm. Hg

(16) The compound of the formula

M.P. 195–197° C.

(17) The compound of the formula $NC—CCl_2—CO—NH—CH_2—CH_2—N(C_2H_5)_2—HCl$

M.P. 158–160° C.

(18) $NC—CCl_2—COOC_2H_5$, B.P. 67–69° C. under 14 mm. Hg pressure: 300 grams of chlorine were introduced at 140° C. during 8 hours into 226 g. of cyanoacetic acid ethyl ester. The batch was stirred for 3 hours at 140° C. and then fractionated. Literature: E. T. McBee et al., Journ. Am. Chem. Soc. 73, page 5473 (1951)

(19) $NC—CCl_2COOC_2H_4Cl$, B.P. 57–58° C. under 0.01 mm. Hg pressure: 500 grams of chlorine were introduced during 20 hours at 140° C. into 226 g. of cyanoacetic acid ethyl ester while irradiating with ultraviolet light. The batch was then stirred for 3 hours at 140° C. and finally fractionated.

(20) $NC—CBr_2—CONH_2$, melting at 123 to 126° C.; 84 grams of cyanoacetamide and 164 g. of anhydrous sodium acetate were suspended in 1/2 litre of glacial acetic acid; while stirring at 80° C. 200 ml. of a 10-molar solution of bromine in glacial acetic acid were stirred in dropwise and the batch was further stirred for 2 hours at 80° C. The solution was concentrated to half its volume under a water jet vacuum and then stirred into ice water. The precipitate was suctioned off and recrystallized from water with addition of carbon.

(21)  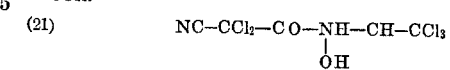

A mixture of 77 g. of 2,2-dichloro-cyanoacetamide, 110 g. of chloral, 3 drops of concentrated sulfuric acid and 150 ml. of carbon tetrachloride was refluxed for 10 hours. At first a clear solution formed from which on further boiling the new compound settled out; after cooling, it was suctioned off and recrystallized from aqueous ethanol.

EXAMPLE 2

Antibacterial action in the dilution test 20 mg. each of the active substances Nos. 1 to 13, were dissolved in 10 ml. of propyleneglycol (=0.2% of active substance). 0.25 ml. of each solution was added to 4.75 ml. of sterile glucose broth (=100 parts per million) and further diluted 1:10 in the tubes themselves.

The contents of each tube were inoculated with *Staphylococcus aureus* and, respectively, with *Escherichia coli* and incubated for 48 hours at 37° C. (bacteriostatic test). After allowing the culture to grow for 24 hours, the amount of culture held by a wire loop from each tube was smeared over glucose-agar plates and likewise incubated for 24 hours at 37° C. (bacteriocidal test).

After the afore-mentioned times the following *limit concentration values* were found:

TABLE 1

| Compound No. | Staphylococcus aureus | | Escherichia coli | |
| --- | --- | --- | --- | --- |
| | Bacteriostatic effect | Bacteriocidal effect | Bacteriostatic effect | Bacteriocidal effect |
| 1 | 100 | 100 | 100 | 100 |
| 2 | 10 | 10 | 10 | 10 |
| 3 | 10 | 10 | 10 | 10 |
| 4 | 10 | 10 | 10 | 10 |
| 5 | 100 | 100 | 100 | 100 |
| 6 | 100 | 100 | 100 | 100 |
| 7 | 100 | 100 | 100 | 100 |
| 8 | 10 | 10 | 100 | 100 |
| 9 | 100 | 100 | 100 | 100 |
| 10 | 100 | 100 | 100 | 100 |
| 11 | 100 | 100 | 100 | 100 |
| 12 | 100 | 100 | 100 | 100 |
| 13 | 100 | 100 | 100 | 100 |

The active substances Nos. 14 to 21 developed similar good effects.

Antimycotic action in the dilution test

Solutions of the active substances Nos. 1 to 13 described in Example 1 in propyleneglycol of descending concentrations were introduced in tubes containing sterile 10% beerwort solution. After inoculation with *Aspergillus niger* and, respectively, with *Rhizopus nigricans* the cultures were incubated for 72 hours at 25° C. (fungistatic test). The following *limit concentration values* were found:

TABLE 2

| Compound No. | Aspergillus niger bacteriostatic effect | Rhizopus nigricans bacteriostatic effect |
|---|---|---|
| 1 | 30 | 125 |
| 2 | 100 | 100 |
| 3 | 100 | 100 |
| 4 | 100 | 100 |
| 5 | 30 | 250 |
| 6 | 30 | 250 |
| 7 | 30 | 250 |
| 8 | 1,000 | 1,000 |
| 9 | 500 | 500 |
| 10 | 125 | 125 |
| 11 | 100 | 100 |
| 12 | 100 | 100 |
| 13 | 100 | 100 |

The active substances Nos. 14 to 21 displayed in the above tests similar good actions.

A good effect was also obtained against *Candida albicans*.

What is claimed is:
1. A compound of the formula

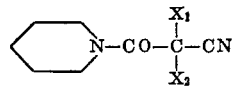

in which $X_1$ represents a member selected from the group consisting of hydrogen, chlorine and bromine, and $X_2$ represents chlorine when $X_1$ is hydrogen or chlorine and bromine when $X_1$ is hydrogen or bromine.

2. A compound according to claim 1 which is 2,2-dichloro-cyanoacetic acid piperidide.

References Cited

UNITED STATES PATENTS 3,122,547  2/1964  Osdene et al. _____ 260—251.5
3,143,466  8/1964  Abood _____ 167—65

JOHN D. RANDOLPH, Primary Examiner

G. T. TODD, Assistant Examiner